United States Patent
Muramori et al.

(10) Patent No.: US 11,654,355 B2
(45) Date of Patent: May 23, 2023

(54) OPERATION INPUT PROGRAM AND OPERATION INPUTTING METHOD

(71) Applicant: Clap Hanz Limited, Yokohama (JP)

(72) Inventors: Masashi Muramori, Yokohama (JP); Toshiyuki Kuwabara, Yokohama (JP)

(73) Assignee: Clap Hanz Limited, Yokohama (JP)

( * ) Notice: Subject to any disclaimer, the term of this patent is extended or adjusted under 35 U.S.C. 154(b) by 0 days.

(21) Appl. No.: 17/639,834

(22) PCT Filed: Dec. 18, 2020

(86) PCT No.: PCT/JP2020/047566
§ 371 (c)(1),
(2) Date: Mar. 2, 2022

(87) PCT Pub. No.: WO2021/132108
PCT Pub. Date: Jul. 1, 2021

(65) Prior Publication Data
US 2022/0323860 A1    Oct. 13, 2022

(30) Foreign Application Priority Data

Dec. 25, 2019  (JP) .............................. JP2019-235134

(51) Int. Cl.
*A63F 13/426*  (2014.01)
*A63F 13/2145*  (2014.01)
(Continued)

(52) U.S. Cl.
CPC ........ *A63F 13/426* (2014.09); *A63F 13/2145* (2014.09); *A63F 13/812* (2014.09); *A63F 13/92* (2014.09)

(58) Field of Classification Search
CPC .. A63F 13/426; A63F 13/2145; A63F 13/812; A63F 13/92
See application file for complete search history.

(56) References Cited

U.S. PATENT DOCUMENTS

2011/0080430 A1   4/2011   Nishibe et al.
2017/0021270 A1*  1/2017   Wang ..................... A63F 13/92

FOREIGN PATENT DOCUMENTS

JP   2002-000939 A   1/2002
JP   2011-81440 A    4/2011
(Continued)

OTHER PUBLICATIONS

International Search Report dated Mar. 16, 2021 in PCT/JP2020/047566 filed Dec. 18, 2020, 2 pages.
(Continued)

*Primary Examiner* — Yingchuan Zhang
(74) *Attorney, Agent, or Firm* — Oblon, McClelland, Maier & Neustadt, L.L.P.

(57) ABSTRACT

To enable to accept users' operation inputs complying with users' wishes.

In a shot operation of a golf game, a portable digital assistant specifies the first touch point and the last touch point by a user as a first operation point and a third operation point, respectively. And the portable digital assistant specifies the touch point that the moving direction of the Y direction reversed or stopped as a second operation point, by tracing the touch points in reverse order to the order detected each touch point from the last touch point. Thereby, the portable digital assistant can recognize that, in the user's touch operations, the position the user lastly reversed the moving direction of the Y direction or stopped his/her finger or the like was operated while being conscious of as the second operation point. As a result, a shot operation complying with the user's wish can be performed.

10 Claims, 11 Drawing Sheets

(51) Int. Cl.
  *A63F 13/812* (2014.01)
  *A63F 13/92* (2014.01)

(56) References Cited

FOREIGN PATENT DOCUMENTS

| | | |
|---|---|---|
| JP | 5873592 B1 | 3/2016 |
| JP | 2017-618 A | 1/2017 |
| JP | 2017-29577 A | 2/2017 |
| JP | 2017-162272 A | 9/2017 |
| WO | WO 2019/130966 A1 | 7/2019 |

OTHER PUBLICATIONS

Extended European Search Report dated Nov. 3, 2022 in European Application 20906810.5, 11 pages.

\* cited by examiner

OPERATION INPUT PROGRAM AND OPERATION INPUTTING METHOD

CROSS-REFERENCE TO RELATED APPLICATIONS

This application is a national stage application of International Application No. PCT/JP2020/47566, filed Dec. 18, 2020, which is based upon and claims the benefit of priority to Japanese Patent Application No. 2019-235134, filed Dec. 25, 2019. The entire contents of these applications are incorporated herein by reference.

TECHNICAL FIELD

The present invention relates to an operation input program and an operation inputting method, and is suitably applied to shot operations of golf games, for example.

BACKGROUND ART

Heretofore, in golf games, it has widely spread that the trajectory of a ball in a virtual space is calculated based on user's shot operation and the situation moving the ball based on this calculation result is displayed on a screen.

For instance, a stationary game device is able to advance a game based on user's operation inputs to a controller, in a state where a game device body is connected to a television device, a display monitor and the like, and the controller provided with a plurality of operation buttons and the like is connected to the game device body by wiring or radio.

Such stationary game device, when a golf game is played by a user, for instance, when in making the user perform a shot operation, makes the user perform push operations three times via an operation button on the controller. At this time, the game device determines the strength and the direction of a shot, and the spin amount of a ball and the like, according to the timing and the time interval of each push operation by the user. The trajectory of the ball can be calculated based on these (See Patent Document 1, for example).

PRIOR ART DOCUMENTS

Patent Documents

Patent Document 1: Japanese Patent Application Laid-open Publication No. 2003-71131 (FIG. 4 and the like)

SUMMARY OF THE INVENTION

Problems to be Solved by the Invention

On the other hand, in recent years, portable digital assistants such as smartphones and tablet computers have widely spread, and users' needs that want to play a golf game as an application are increasing also in these portable digital assistants.

In general, in these portable digital assistants, display of screens and operation inputs are performed by a touch panel. In this touch panel, in addition to a touch operation (also called tap operation) by that a user touches it with his/her finger or the like only for a short time, various operations such as a swipe operation by moving the user's finger or the like on the touch panel while keeping to touch, and a flic operation by rapidly making to move the user's finger or the like, and the like are acceptable.

Therefore, in golf games to be executed on portable digital assistants, it is needed to be able to execute plays further complying with users' wishes by adopting operation input methods suitable for touch panels.

The present invention has been made in view of the above points, and is to provide an operation input program and an operation inputting method acceptable users' operation inputs complying with users' wishes.

Means for Solving the Problems

To solve the above problems, in an operation input program of the present invention, to an information processing device, it is designed to perform the following steps: a detecting step of detecting, when successive touch operations to a touch panel were performed, the touched positions as touch points for each prescribed period; a recording step of sequentially recording data representing the positions and the order of the touch points; a first operation point specifying step of specifying the touch point firstly detected in the touch operations as a first operation point; a third operation point specifying step of specifying the touch point lastly detected in the touch operations as a third operation point; a second operation point specifying step of specifying, after the third operation point was specified, the touch point that the moving direction of a prescribed axis direction reversed or stopped as a second operation point, by tracing the plural touch points in reverse order to the order that the touch points were detected in the detecting step from the third operation point; and a parameter determining step of determining parameters to be used in an application based on the positions of the first operation point, the second operation point and the third operation point.

Furthermore, in an operation input method of the present invention, it is designed to have the following steps: a detecting step of detecting, when successive touch operations to a touch panel were performed, the touched positions as touch points for each prescribed period, by a detecting section; a recoding step of sequentially recording data representing the positions and the order of the touch points, by a recording section; a first operation point specifying step of specifying the touch point firstly detected in the touch operations as a first operation point, by a first operation point specifying section; a third operation point specifying step of specifying the touch point lastly detected in the touch operations as a third operation point, by a third operation point specifying section; a second operation point specifying step of specifying, after the third operation point was specified, the touch point that the moving direction of a prescribed axis direction reversed or stopped as a second operation point, by tracing the plural touch points in reverse order to the order that the touch points were detected in the detecting step from the third operation point, by a second operation point specifying section; and a parameter determining step of determining parameters to be used in an application based on the positions of the first operation point, the second operation point and the third operation point, by an instruction accepting section.

The present invention specifies, after the third operation point was specified, the touch point that the moving direction of a prescribed axis direction reversed or stopped as a second operation point, by tracing the touch points in reverse order to the order that the touch points were detected from the third operation point. Therefore, the present invention is able to specify, even if the user reconsidered the position that should be set as the second operation point while performing the touch operations, or even if the user could not operate well and moved his/her finger so as to correct the position, the touch point that the moving direction of the prescribed axis direction lastly reversed or stopped as a second operation point, by regarding this as the most appropriate touch point.

Advantageous Effect of the Invention

According to the present invention, it is able to realize an operation input program and an operation inputting method capable of accepting users' operation inputs complying with users' wishes.

EMBODIMENTS FOR CARRYING OUT THE INVENTION

Hereinafter, embodiments for carrying out the invention (hereinafter, these are referred to as embodiments) will be described with reference to drawings.

1. First Embodiment

[1-1. Configuration of Portable Digital Assistant]

Figure 1:
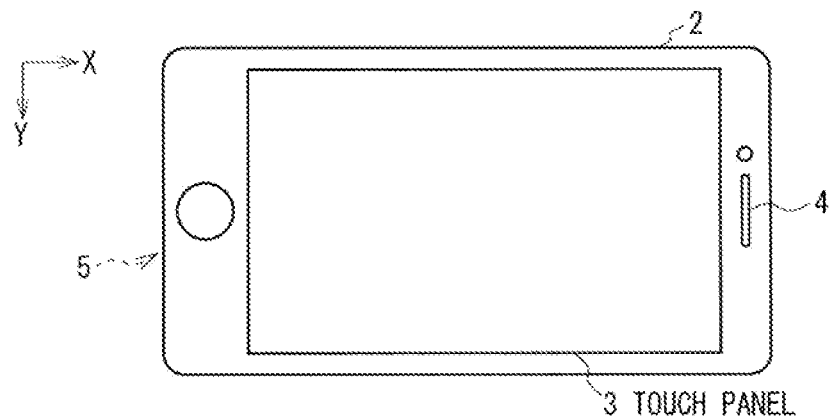
FIG. 1 is a schematic diagram showing an appearance configuration of a portable digital assistant.

As shown in FIG. 1, a portable digital assistant 1 according to a first embodiment is a smartphone, for example, in which various parts are incorporated in a housing 2 formed in a flat rectangular parallelepiped shape and a touch panel 3 is incorporated at the front. In the portable digital assistant 1, also a speaker 4 for emitting sound, and a microphone 5 for converting sound to an electric signal and the like are incorporated.

For convenience of explanation, hereinafter, as shown in FIG. 1, it is supposed that the portable digital assistant 1 is in the attitude that the longitudinal direction of the touch panel 3 is along with the horizontal direction and the short direction is along with the vertical direction, and is in the attitude that the touch panel 3 is directed toward the user's side. Furthermore, hereinafter, in screens to be displayed in the touch panel 3 (the details will be described later), the direction going from the left side to the right side is defined as an X direction, and the direction going from the upper side to the lower side is is defined as a Y direction.

Figure 2:
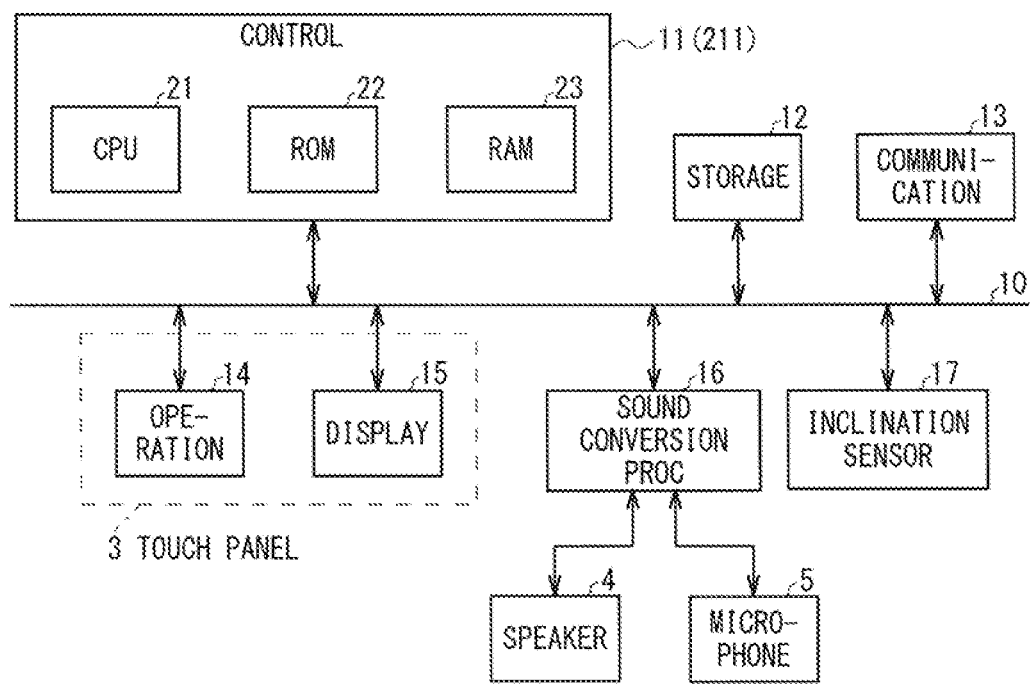
FIG. 2 is a block diagram showing the circuit configuration of the portable digital assistant.

In the inside of the portable digital assistant 1, as showing a schematic circuit configuration in FIG. 2, a control section 11, a storage section 12, a communication section 13, an operation section 14, a display section 15, a sound conversion processing section 16, an inclination sensor 17, etc. are connected via a bus 10.

The control section 11 has a CPU (Central Processing Unit) 21, a ROM (Read-Only Memory) 22 and a RAM (Random-Access Memory) 23, and the like. This CPU 21 reads, if a power is turned on, various programs such as an operating system and various kinds of applications from the ROM 22 and the storage section 12, and executes them while using the RAM 23 as a work area. Thereby, the control section 11 executes various processing, and integrally controls the portable digital assistant 1.

The storage section 12 is for example a flash memory, and stores various programs, data and the like. The communication section 13 establishes a communication connect to/from a base station not shown according to a mobile communication standard called 4G (4th Generation) or 5G (5th Generation) for example, and transmits/receives various information. The communication section 13 is also the interface of a wireless LAN based on a standard such as IEEE (Institute of Electrical and Electronics Engineers) 802, and 11a/b/g/n/ac, and transmits/receives various information to/from a base station not shown (also called base unit).

The operation section 14 is a touch sensor being a part of the touch panel 3, which detects a touch by a user's finger or the like and supplies information of the position or the like as an operation input by the user to the control section 11. The display section 15 is a liquid crystal display panel being a part of the touch panel 3, which displays various screens including various characters, graphics, etc. based on control by the control section 11. In this connection, the display section 15 displays and updates the screens at the frame rate of 30 frames/sec for example.

The sound conversion processing section 16 is a part performing mutual conversion processing between sound data and sound signals and various processing of sound signals and sound data, and the aforementioned speaker 4 and microphone 5, etc. are connected thereto. For instance, the sound conversion processing section 16 converts sound data supplied from the control section 11 to a sound signal and supplies this to the speaker 4, and emitting sound from the speaker 4. Furthermore, the sound conversion processing section 16 converts sound signals generated by collecting ambient sound with the microphone 5 to sound data, and supplies this to the control section 11.

The inclination sensor 17 is a gyro sensor for example, and recognizes the attitude of the housing 2 by detecting the gravity, the direction of terrestrial magnetism and the like, and supplies information representing this attitude to the control section 11. According to this, in a screen to be displayed in the display section 15 of the touch panel 3, the control section 11 enables to turn the direction displaying characters etc. to a direction that the user can easily read it.

[1-2. Processing Accompanying with Start of Golf Game]

Next, it will be described about processing in the case of starting a golf game in the portable digital assistant 1. Concretely, if the control section 11 of the portable digital assistant 1 (FIG. 2) accepts an operation instruction to start the golf game by a user via the operation section 14, the control section 11 reads and executes the application program of the golf game previously stored in the storage section 12.

Figure 3:
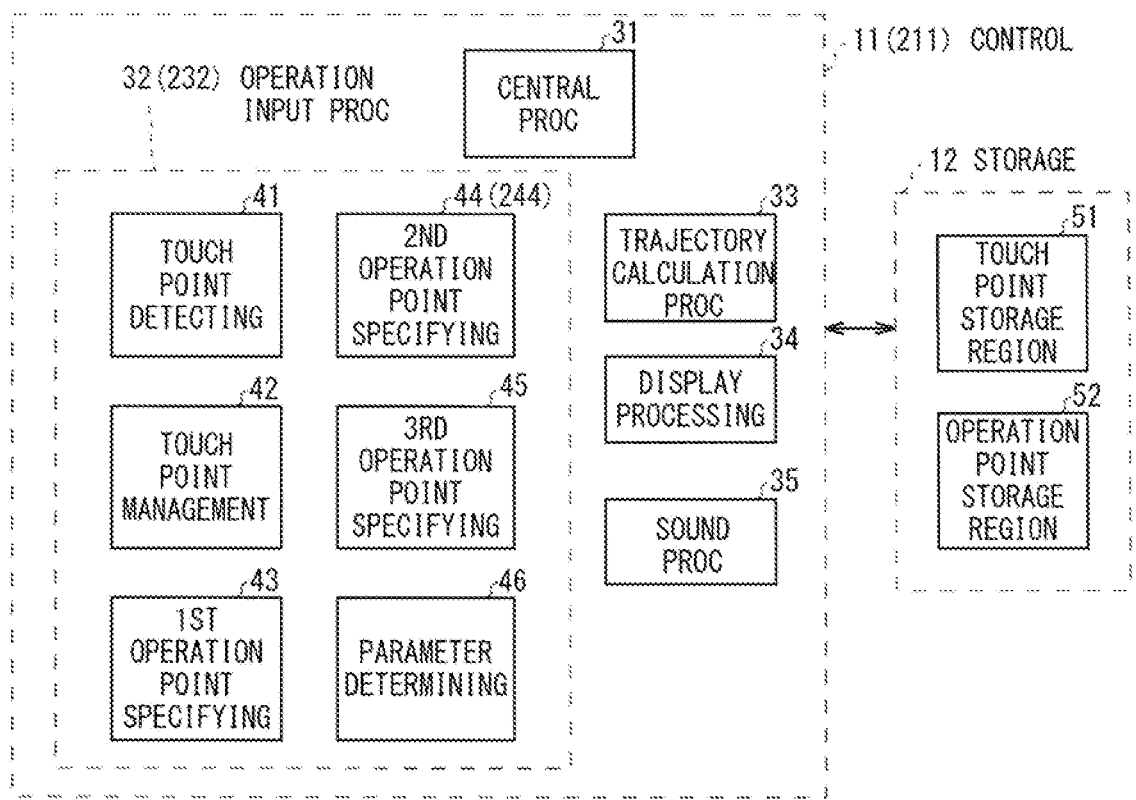
FIG. 3 is a block diagram showing the functional block configuration of a control section and a storage section.

At this time, as shown in FIG. 3, the control section 11 forms inside a plurality of functional blocks such as a central processing section 31, an operation input processing section 32, a trajectory calculation processing section 33, a display processing section 34 and a sound processing section 35. Among these, the central processing section 31 performs processing for managing overall progress of the golf game, and processing for cooperation with each functional block and the like.

Figure 4:
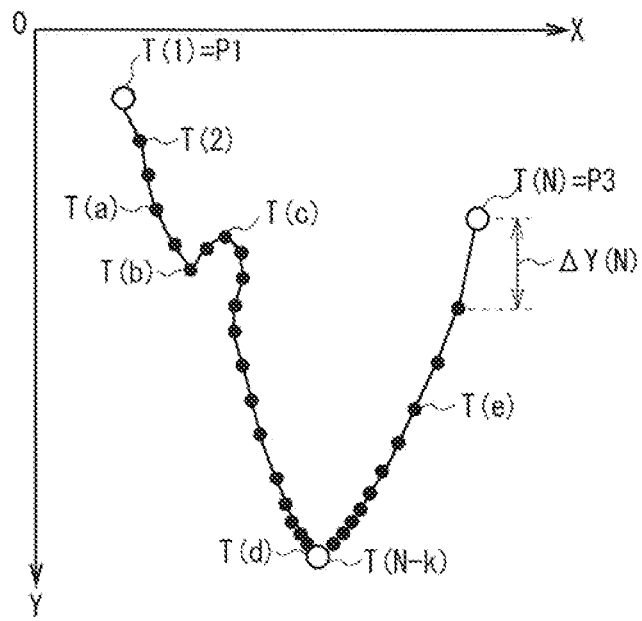
FIG. 4 is a schematic diagram showing the detection of touch points and the specifying of operation points according to a first embodiment.
Figure 5:
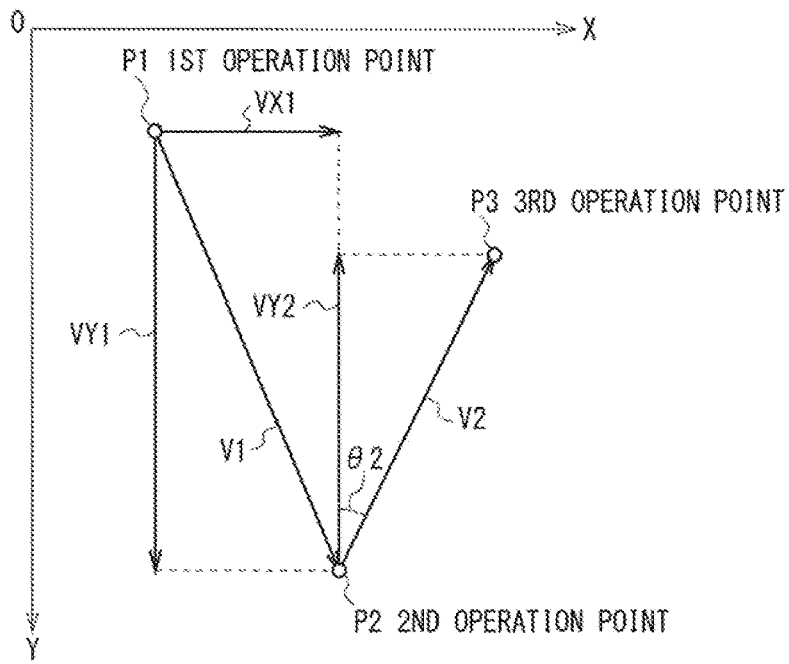
FIG. 5 is a schematic diagram showing the relationship between the positions of operation points and shot parameters.

The operation input processing section 32 is a part for performing processing for user's operation inputs to the operation section 14 of the touch panel 3, mainly on shot motions. On a shot motion, as shown in FIG. 4 as a schematic diagram of an XY coordinate plane, this operation input processing section 32 first sequentially detects a position that the user did a touch operation to the operation section 14 as a touch point T(i) by frames. Furthermore, as shown in FIG. 5 corresponding to FIG. 4, it is designed that the operation input processing section 32 specifies operation points P at three positions, i.e. a first operation point P1, a second operation point P2 and a third operation point P3 respectively based on the plural touch points T(i), and determining a plurality of parameters necessary for the shot motion based on these points.

To perform these processing, in the operation input processing section 32, a plurality of functional blocks such as a touch point detecting section 41, a touch point management section 42, a first operation point specifying section 43, a second operation point specifying section 44, a third operation point specifying section 45 and a parameter determining section 46 are provided. Their details will be described later.

The trajectory calculation processing section 33 calculates a trajectory when a golf ball moves forward by a shot motion based on determined parameters. The display processing section 34 performs processing for generating a screen to be displayed on the display section 15. The sound processing section 35 performs processing to generate sound effect or the like according to a shot operation, or the like.

The storage section 12 forms inside a touch point storage region 51 and an operation point storage region 52 according to control by the control section 11. Their details will be described later.

Then, the control section 11 performs initial setting processing. Concretely, the control section 11 to make display a predetermined initial setting screen (not shown) in the display section 15 by the display processing section 34, to make arbitrary select or set a user items necessary to a start of a golf game, such as a character to be displayed on a screen, a golf course and a golf club.

In this golf game, it is designed that a golf course will be set in a virtual space, and a character hit a golf ball by performing a shot motion on the golf course based on user's shot operations. The orbit which the golf ball moves forward at this time will change according to a user's shot operation to the operation section 14.

The control section 11 displays a predetermined operation explanation screen in the above-mentioned initial setting processing, to explain the concrete operation procedures of a shot operation, and character's motions according to this, and the like to the user.

In this operation explanation screen, they are explained that as a shot operation, users should perform consecutive touch operations as touching the touch panel 3 with his/her finger or the like, moving this finger or the like downward for a while while touching, then moving it upward reversely, and lastly leaving the finger or the like from the touch panel 3, and that operation points P at three positions will be specified based on that operations, and the like.

In addition, in the operation explanation screen, it is explained that the size of a power value will be determined according to the size of a Y-direction component, in a first operation vector V1 going from the first operation point P1 to the second operation point P2, and a horizontal spin amount will be determined according to the size of an X-direction component. Further, in the operation explanation screen, it is explained that a shot angle will be determined according to the angle of a second operation vector V2 going from the second operation point P2 to the third operation point P3 to the Y direction, and a vertical spin amount is determined according to the size of a Y-direction component. For convenience of explanation, hereinafter, parameters which effect to the orbit calculation of a golf ball such as a power value, a horizontal spin amount, a shot angle, and a vertical spin amount are collectively referred to as shot parameters.

In general, in actual golf, it is considered that the size of a power value largely effects to the flying distance of a ball. As such, in this type of golf games, it says that if a user can appropriately input the second operation point P2 by touch operations, a shot motion can be performed with the size of a power value complying with the user's wish, and a flying distance as intended by the user can be realized. Therefore, in this type of golf games, it has possibilities that in touch operations by a user, the user moves his/her finger or the like as carefully specifying the second operation point P2.

In this connection, in the operation explanation screen, it is also explained that an operation "moving a user's finger or the like downward while touching" corresponds to a motion of a character "bringing up a golf club", and that an operation "moving the finger or the like upward while touching" corresponds to a motion of the character "bringing down the golf club".

[1-3. Shot Operation Processing]

Next, it will be described about shot operation processing for driving a golf ball once by making the user perform a shot operation. If the above-described initial setting processing is completed, the control section 11 starts a shot operation processing procedure RT1 shown in FIG. 6 and proceeds to a step SP1.

In the step SP1, the control section 11 makes the user perform a predetermined shot preparation operation and appropriately perform operations regarding items that should be prepared for the shot operation such as selecting a golf club, and adjusting the standing position of a character, and proceeds to the next step SP2.

Figure 7:
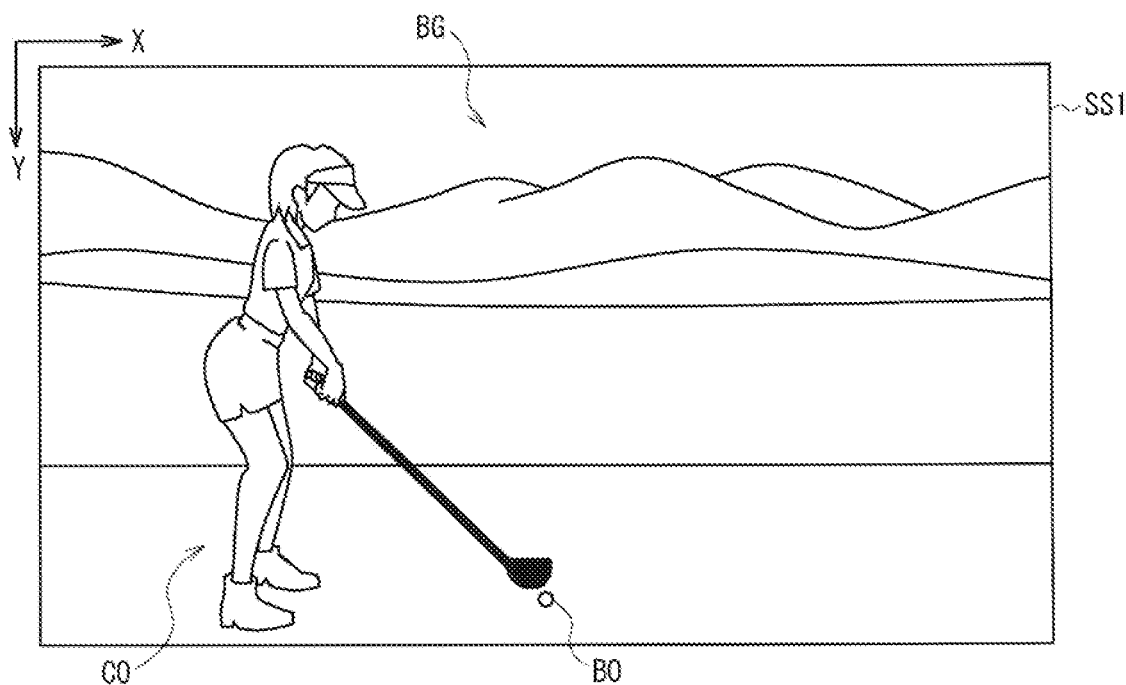
FIG. 7 is a schematic diagram showing the structure of a shot screen.

In the step SP2, the control section 11 makes to display a shot screen SS1 shown in FIG. 7 in the display section 15 by the display processing section 34 (FIG. 3), and proceeds to the next step SP3. This shot screen SS1 represents a scene that the character performs a shot motion in a golf course in a virtual space as a pictorial image, and in which a character object CO, a ball object BO etc. are arranged as overlapped with a background BG.

In the step SP3, the control section 11 executes touch point detecting processing to detect plural touch points T (FIG. 4) (the details will be described later), based on the user's touch operations to the operation section 14 (i.e. the touch panel 3) by the operation input processing section 32 (FIG. 3) as a subroutine, and proceeds to the next step SP4. In this connection, in the operation point specifying processing, also screens displayed in the display section 15 will be appropriately updated according to user's touch operations.

In the step SP4, the control section 11 specifies the operation points P at three positions necessary to a shot motion (FIG. 5) based on the plural touch points T by the operation input processing section 32 (FIG. 3), and furthermore, executes the operation point specifying processing to determine the shot parameters necessary to a shot operation (the details will be described later) as a subroutine, and proceeds to the next step SP5.

In the step SP5, the control section 11 determines whether or not all of the operation points P at three positions (FIG. 5) could be specified in the step SP4. If a negative result is obtained here, this means that because the user did not perform appropriate touch operations, the operation points P at three positions cannot be specified and an orbit of a golf ball cannot be calculated. At this time, the control section 11 prompts the user for performing touch operations again by such as displaying a predetermined error message in the display section 15, then repeats to the step SP3 to repeat the series of processing.

On the other hand, if an affirmative result is obtained in the step SP5, the control section 11 proceeds to the next step SP6. In the step SP6, the control section 11 executes orbit calculating processing to calculate the orbit of a ball based on shot parameters by the orbit calculation processing section 33 (FIG. 3), and proceeds to the next step SP7.

In the step SP7, the control section 11 displays a screen representing a scene that the golf ball goes forward (the details will be described later) in the display section 15, based on the calculated orbit by the display processing section 34 (FIG. 3), and then proceeds to the next step SP8 to finish the shot operation processing procedure RT1.

In this connection, the control section 11 repeatedly executes the shot operation processing procedure RT1 for each one shot during the execution of the golf game.

[1-4. Touch Point Detecting Processing]

Figure 8:
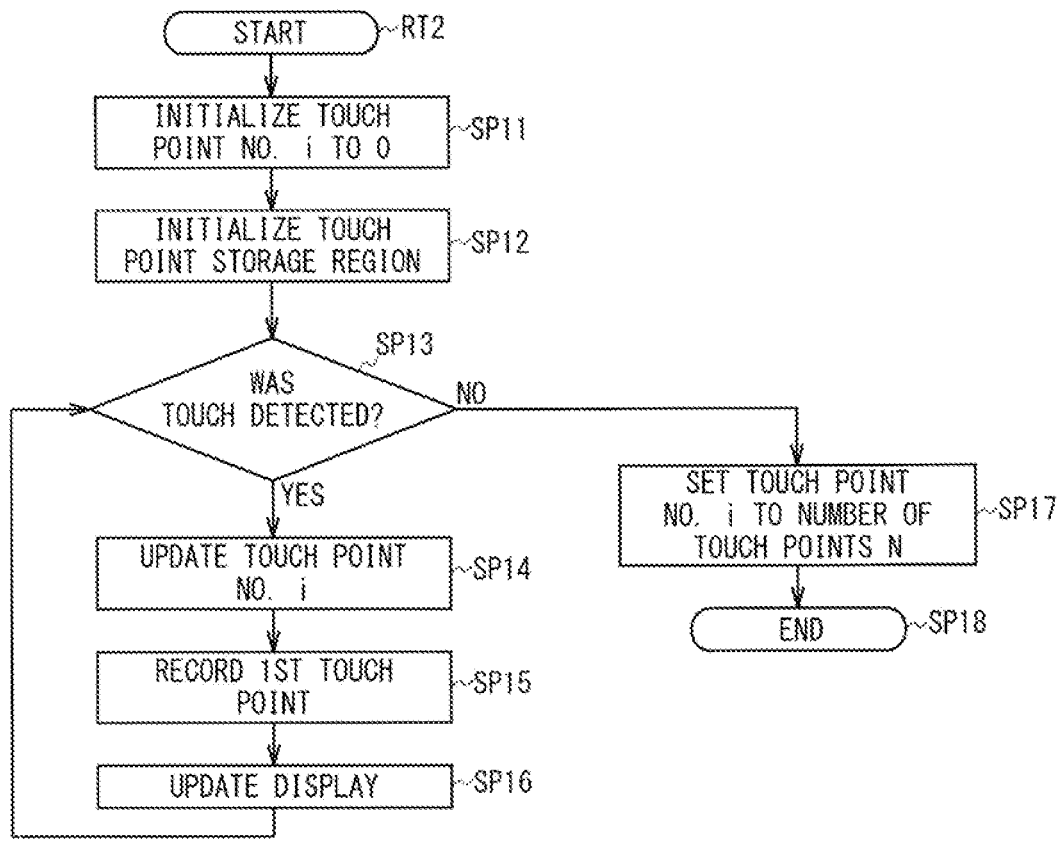
FIG. 8 is a flowchart showing a touch point detecting processing procedure.

Next, it will be described about touch point detecting processing for sequentially detecting a plurality of touch points by the operation input processing section 32 of the control section 11 (FIG. 3), based on user's touch operations to the operation section 14 of the touch panel 3 in one shot motion, with reference to a flowchart of FIG. 8.

If the control section 11 proceeds to the step SP3 in the shot operation processing procedure RT1 (FIG. 6), the control section 11 makes to start a touch point detecting processing procedure RT2 (FIG. 8) as a subroutine by the operation input processing section 32, and proceeds to the first step SP11.

In the step SP11, the operation input processing section 32 initializes a touch point number i that is a variable to be used in the following processing to a value "0", and proceeds to the next step SP12. This touch point number i is a value to be used for individually identifying touch points T that are positions touched by the user on the operation section 14 of the touch panel 3 and also representing their order. In the step SP12, the operation input processing section 32 initializes the touch point storage region 51 of the storage section 12 (FIG. 3), and proceeds to the next step SP13.

In the step SP13, the operation input processing section 32 determines whether or not touches by the user's finger or the like were detected in the operation section 14 of the touch panel 3 by the touch point detecting section 41 (FIG. 3). If an affirmative result is obtained here, this means that the user performed the touch operations as touching his/her finger or the like to the operation section 14 and it is necessary to record information concerning the touch points T to which the touches were detected (FIG. 4). At this time, the control section 11 proceeds to the next step SP14.

In the step SP14, the operation input processing section 32 updates the information by adding a value "1" to the touch point number i, and proceeds to the next step SP15. In the step SP15, the operation input processing section 32 records a coordinate value in the XY plane of the detected touch points T in the touch point storage region 51 of the storage section 12 (FIG. 3), by associating with the present touch point number i by the touch point management section 42 (FIG. 3), and proceeds to the next step SP16.

Thereby, in the touch point storage region 51, the information concerning the coordinate value in the XY plane of the i-th touch point T(i) and the detected order and the like is stored. For instance, as shown in FIG. 4, if the first touch point T(1) is detected, the XY coordinate value representing this touch point T(1) is stored in the touch point storage region 51, by associating with an arbitrary touch point number "1" representing the detected order.

In the step SP16, the operation input processing section 32 updates the display by making it display a screen corresponding to the detected touch point T in the display section 15 by cooperating with the display processing section 34 (FIG. 3), and then returns to the step SP13 again to repeat a series of the processing. Thereby, the operation input processing section 32 is able to sequentially record the coordinates of the touch points T being the points that the user touched to the operation section 14 with his/her finger or the like and their order, in a cycle of 1/30 second for updating the display screen of the display section 15 for each one frame, during that the user is touching the operation section 14 with his/her finger or the like.

Figure 6:
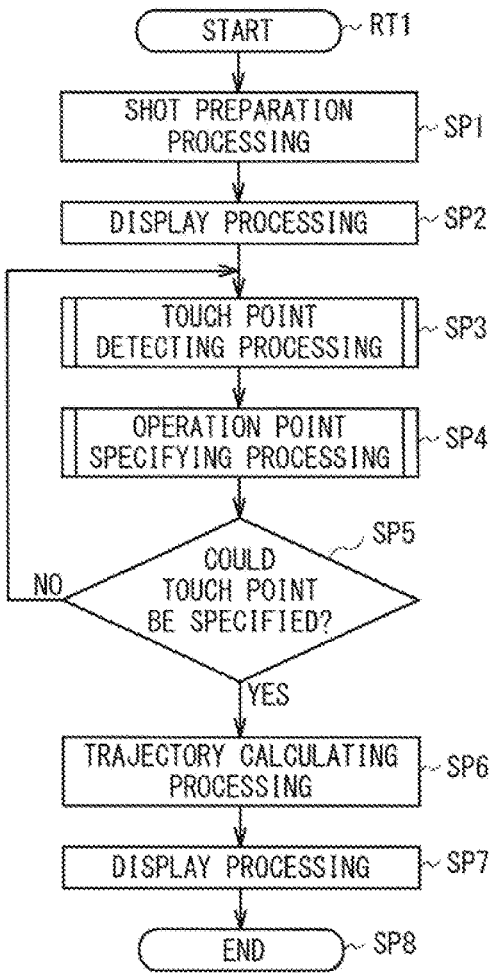
FIG. 6 is a flowchart showing a shot operation processing procedure.

On the other hand, if a negative result is obtained in the step SP13, this means that the user finished a series of the touch operations by leaving his/her finger or the like from the touch panel 3. At this time, the operation input processing section 32 proceeds to the next step SP17. In the step SP17, the operation input processing section 32 makes to store the touch point number i at the time in the storage section 12 as a number of touch points N being the number of the detected touch points T. Then, the operation input processing section 32 proceeds to the next step SP18 to finish the touch point detecting processing procedure RT2, and returns to the step SP3 of the previous shot operation processing procedure RT1 (FIG. 6).

[1-5. Detection of Touch Points and Transition of Screens]

Here, it will be described about the relationship between the coordinates of each touch point T(i) to be detected by the touch point detecting section 41 according to touch operations with a user's finger or the like, and the contents of screens to be displayed in the display section 15. As described above, in a shot operation, it makes the user perform touch operations as that moves his/her finger or the like downward, next moves it upward, while making to contact the finger or the like with the touch panel 3, and then leaving the finger or the like from the touch panel 3.

Figure 9:
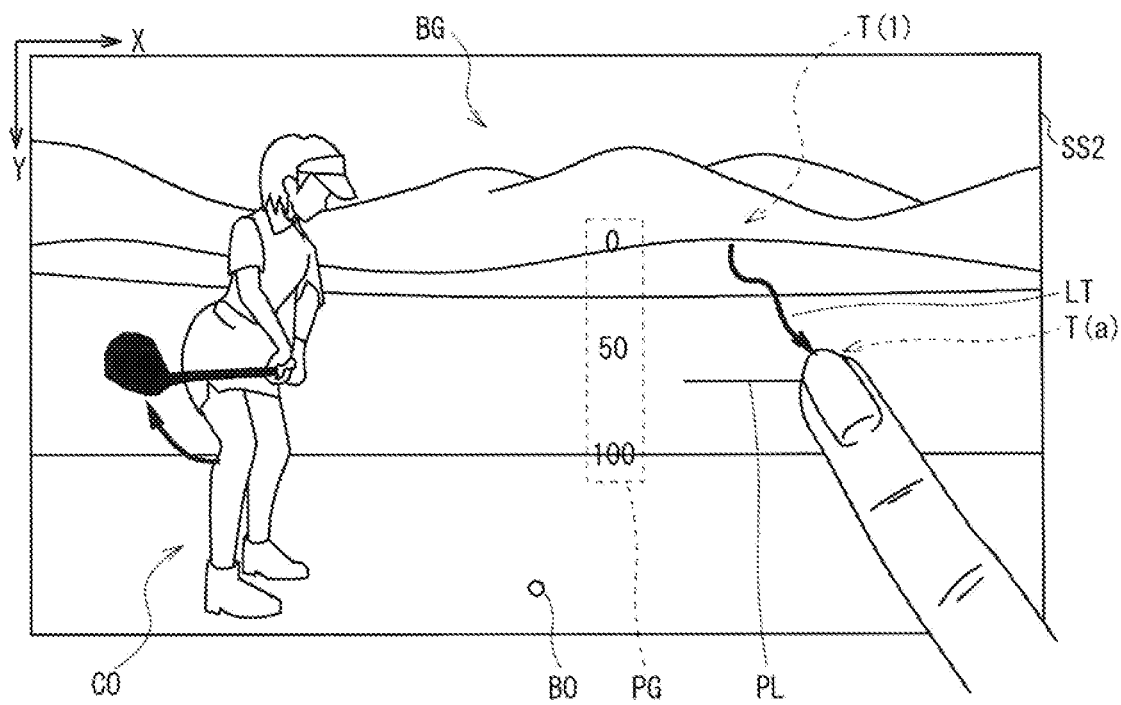
FIG. 9 is a schematic diagram showing the structure of a shot screen.

For instance, when the first touch point T(1) was detected by the touch point detecting section 41, and then a touch point T(a) was detected on the more Y direction (downward direction) side than the touch point T(1) (FIG. 4), the operation input processing section 32 makes to display a shot screen SS2 shown in FIG. 9 in the display section 15 by cooperating with the display processing section 34.

In this shot screen SS2, the attitude and the state of a character object CO has changed comparing to the first shot screen SS1 (FIG. 7). In addition, a power gage PG by numerical numbers such as "0", "50" and "100", and a power line PL extended from the present touch point to the horizontal direction are displayed.

The character object CO changes its attitude as bringing up a golf club as that the touch point T moves downward. On the other hand, the power gage PG represents a distance to the Y direction (that is, downward direction in the shot screen SS2) by numerical numbers based on the first touch point T(1), and means the correspondence between the size of power in a shot motion (the size of power to be added to a golf ball) and the position in the Y direction. The power line PL is shown by a straight line that connects the power gage PG and the present touch point T(a) in the horizontal direction, so that the user can recognize an approximate value of power corresponding to the present touch point T(a).

In this connection, FIG. 9 shows the situation that the user's finger is overlapping with the touch panel 3 displaying the shot screen SS2 in the display section 15, and the fingertip is contacting with the operation section 14. In addition, in FIG. 9, the first touch point T(1) and T(a), and a touch locus line LT which represents a locus of the user's finger or the like are shown in the shot screen SS2. These are, however, shown for convenience of explanation. That is, in the actual shot screen SS2, the touch point T(1) and T(a), and the touch locus line LT are not shown.

Figure 10:
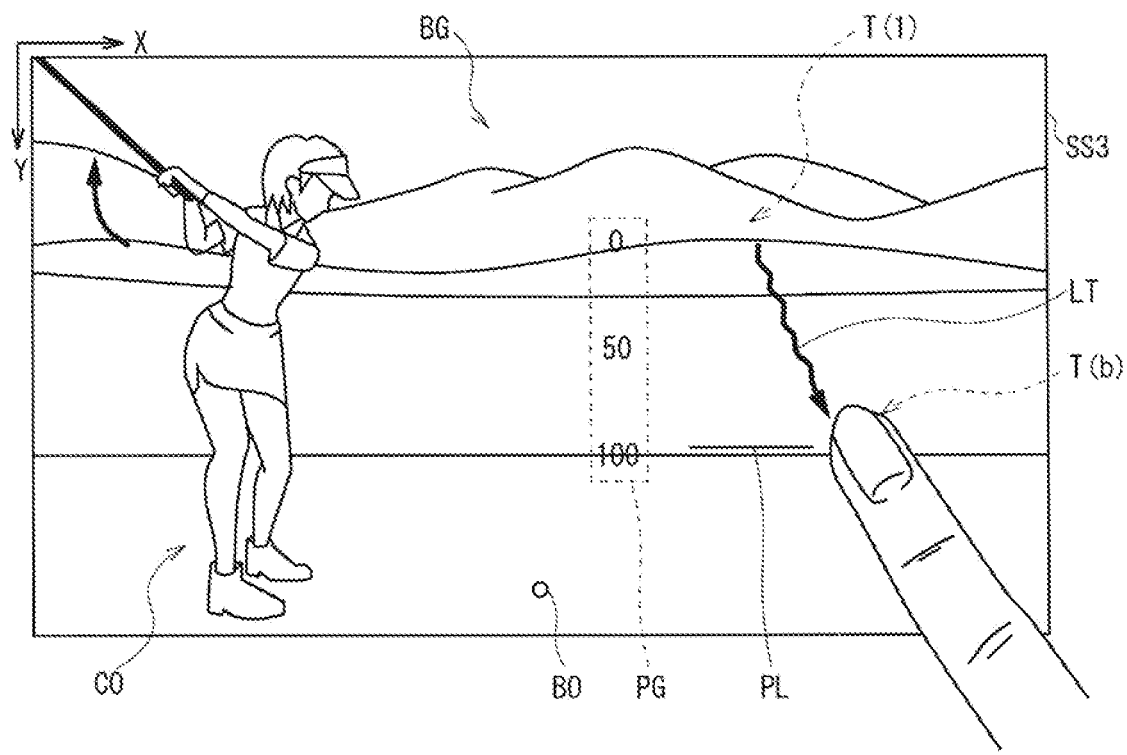
FIG. 10 is a schematic diagram showing the structure of a shot screen.

And then, when a touch point T(b) that further moved from the touch point T(a) to the Y direction (downward direction) was detected by the touch point detecting section 41 (FIG. 4), the operation input processing section 32 makes to display a shot screen SS3 shown in FIG. 10 in the display section 15 by associating with the display processing section 34. In the shot screen SS3, the power line PL has further moved to the Y direction (that is, downward direction) according to the position of the touch point T(b), comparing to the shot screen SS2, and the character object CO has changed to an attitude further bringing up the golf club.

Figure 11:
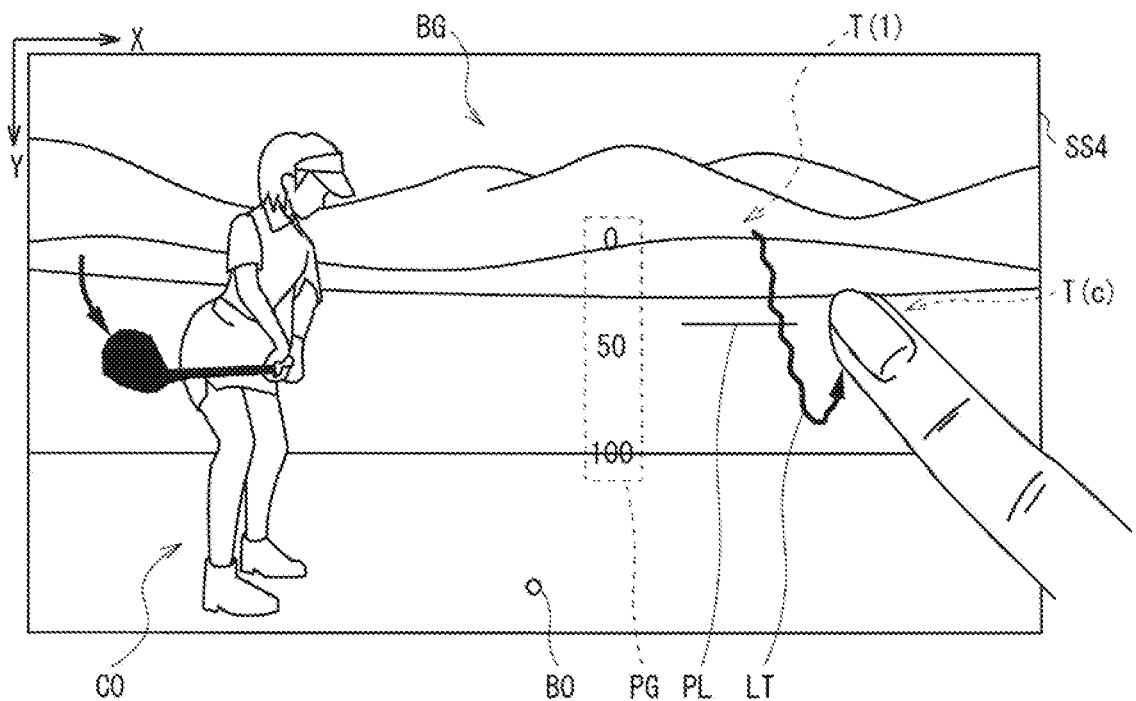
FIG. 11 is a schematic diagram showing the structure of a shot screen.

Eventually, when a touch point T(c) that was moved from the touch point T(b) to the −Y direction (upward direction) was detected by the touch point detecting section 41 (FIG. 4), the operation input processing section 32 makes to display a shot screen SS4 shown in FIG. 11 in the display section 15 by associating with the display processing section 34. In the shot screen SS4, the power line PL has further moved to the −Y direction (that is, upward direction) according to the position of the touch point T(c), comparing to the shot screen SS3, and the character object CO has changed to an attitude slightly bringing down the golf club.

Figure 12:
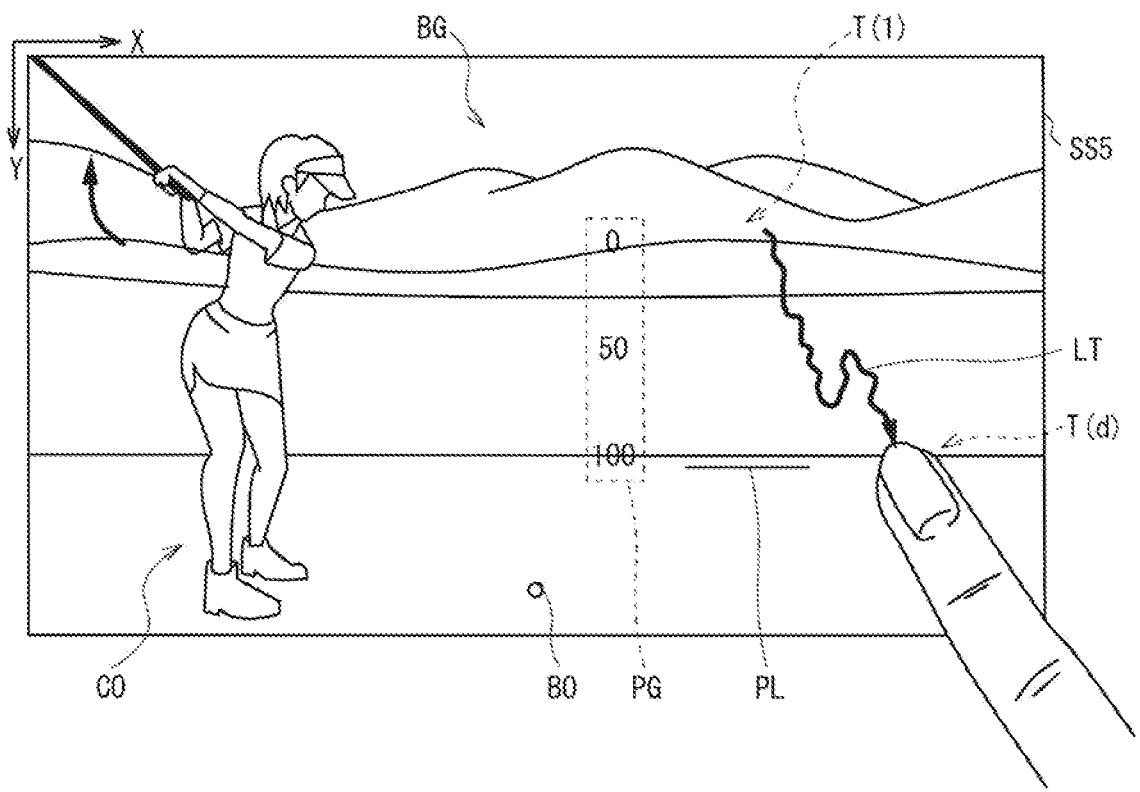
FIG. 12 is a schematic diagram showing the structure of a shot screen.

Subsequently, when a touch point T(d) that was moved again from the touch point T(c) to the Y direction (downward direction) was detected by the touch point detecting section 41 (FIG. 4), the operation input processing section 32 makes to display a shot screen SS5 shown in FIG. 12 in the display section 15 by associating with the display processing section 34. In the shot screen SS5, the power line PL has further moved to the Y direction (that is, downward direction) again according to the position of the touch point T(d), comparing to the shot screen SS4, and the character object CO has changed to an attitude bringing up the golf club again.

Figure 13:
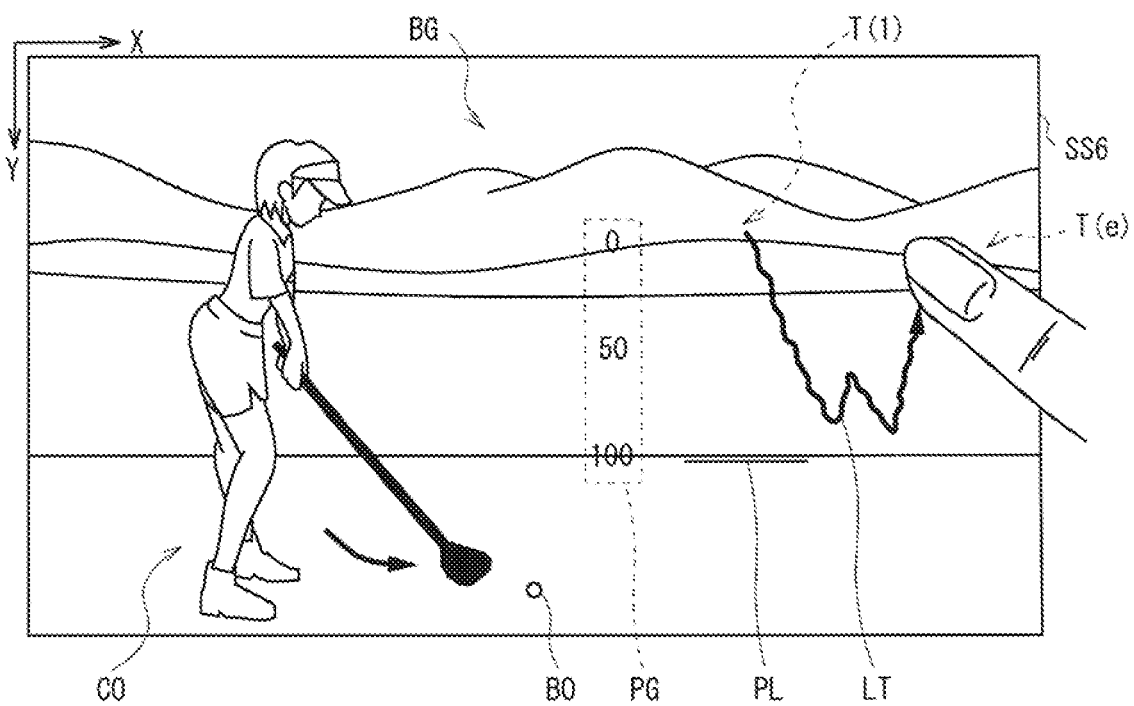
FIG. 13 is a schematic diagram showing the structure of a shot screen.

Next, when a touch point T(e) that was moved from the touch point T(d) to the −Y direction (upward direction) was detected by the touch point detecting section 41 (FIG. 4), the operation input processing section 32 makes to display a shot screen SS6 shown in FIG. 13 in the display section 15 by associating with the display processing section 34. In the shot screen SS6, the power line PL has further moved to the −Y direction (that is, upward direction) according to the position of the touch point T(e), comparing to the shot screen SS5, and the character object CO has changed to an attitude further bringing down the golf club.

[1-6. Operation Point Specifying Processing]

Next, it will be described about operation point specifying processing for specifying operation points P at three positions (FIG. 5) by the operation input processing section 32 of the control section 11 (FIG. 3), based on the plural touch points T (FIG. 4) detected in the touch point detecting processing procedure RT2 (FIG. 8), with reference to a flowchart of FIG. 14.

If the processing proceeds to the step SP4 in the shot operation processing procedure RT1 (FIG. 6), the control section 11 makes to start an operation point specifying processing procedure RT3 (FIG. 14) as a subroutine by the operation input processing section 32, and proceeds to the first step SP21.

In the step SP21, the operation input processing section 32 determines whether or not the number of touch points N is 3 or more. If an affirmative result is obtained here, this is means that because three or more points of touch points T were detected in the user's touch operations, there is a possibility to be able to specify the operation points P at three positions. At this time, the operation input processing section 32 proceeds to the next step SP22.

In the step SP22, the operation input processing section 32 determines whether or not the moving distance of Y $\Delta Y(N)$ being a moving distance from the immediately preceding touch point T(N−1) to the touch point T(N) of the Y direction is less than the value "0", that is, whether or not the touch point T(N) is more on the −Y direction side (upper side) than the immediately preceding touch point T(N−1). If an affirmative result is obtained here, this means that the user performed an operation as moving it to upward at the last of the touch operations, and there is a high possibility that the user performed the shot operation appropriately. At this time, the operation input processing section 32 proceeds to the next step SP23.

In the step SP23, the operation input processing section 32 specifies the first touch point T(1) as a first operation point P1 by the first operation point specifying section 43 (FIG. 3), and proceeds to the next step SP24. In the step SP24, the operation input processing section 32 specifies the last touch point T(N) as a third operation point P3 by the third operation point specifying section 45 (FIG. 3), and proceeds to the next step SP25. In the step SP25, the operation input processing section 32 initializes a counter value k to be used for searching for a second operation point P2 to a value "1", and proceeds to the next step SP26.

In step SP26, the operation input processing section 32 determines, for a k-th touch point T(N−k) from the last touch point, whether or not $\Delta Y(N-k)$ being a moving distance from the immediately preceding touch point T(N−k−1) of the Y direction is larger than the value "0", by the second operation point specifying section 44 (FIG. 3). This means to determine whether or not a touch operation moving to the Y direction (downward direction) immediately before the touch point T(N−k) was performed. If a negative result is obtained here, this means that the touch point T(N−k) cannot be regarded as a second operation point P2, because the touch operation moving from the immediately preceding touch point T(N−k−1) to the touch point T(N) toward the −Y direction (upward direction) continues, and the direction of the moving toward the Y direction at the touch point T(N−k) is neither reversed nor stopped. At this time, the operation input processing section 32 proceeds to the next step SP27.

In the step SP27, the operation input processing section 32 determines whether or not the counter value k is smaller than the number of touch points N by the second operation point specifying section 44. If an affirmative result is obtained here, this means that searching for a second operation point P2 should be continued because the present touch point T(N−k) is not the first touch point T(1). At this time, the operation input processing section 32 proceeds to the next step SP28.

In the step SP28, the operation input processing section 32 updates the counter value k by adding a value "1" to the counter value k by the second operation point specifying section 44, and then returns to the step SP26 again to repeat a series of the processing. Thereby, the operation input processing section 32 comes to search for a second operation point P2 while tracing each touch point T from the last touch point T(N) in the reverse order to the order in the detection.

On the other hand, if an affirmative result is obtained in the step SP26, this means that, in the touch operation from the immediately preceding touch point T(N−k−1) to the touch point T(N−k), the touch point moved to the Y direction (downward direction) or did not move to the Y direction and the moving direction of the Y direction reversed or stopped at the touch point T(N−k). That is, this means that the touch operation going toward the Y direction (downward direction) was performed immediately before reaching to the touch point T(N−k), or the touch operation did not move to the Y direction was performed, and then the touch operation only moving to the −Y direction (upward direction) until reaching to a third operation point P3 was performed. At this time, the operation input processing section 32 proceeds to the next step SP29.

In the step SP29, the operation input processing section 32 specifies the (N−k)th touch point T(N−k) as a second operation point P2 by the second operation point specifying section 44, and proceeds to the next step SP30. Thereby, all of the operation points P at three positions comes to be specified.

In the step SP30, the operation input processing section 32 determines shot parameters such as a power value, a horizontal spin amount, a shot angle and a vertical spin amount, by the parameter determining section 46, and makes to store them in the storage section 12, and proceeds to the next step SP32.

Concretely, as shown in FIG. 5, the parameter determining section 46 first calculates a first operation vector V1 from the first operation point P1 going toward the second operation point P2, and a second operation vector V2 from the second operation point P2 going toward the third operation point P3, respectively. Next, the parameter determining section 46 determines a power value and a horizontal spin amount in the shot operation of this time respectively, based on the first operation vector V1. Concretely, as shown in FIG. 5, the parameter determining section 46 detects the power value based on the size of a first operation vector of Y component VY1 being a component of the Y direction in the first operation vector V1. Also, the parameter determining section 46 determines a horizontal spin amount based on the size of a first operation vector of X component VX1 being a component of the X direction in the first operation vector V1.

Further, the parameter determining section 46 determines a shot angle and a vertical spin amount in the shot operation of this time respectively, based on the second operation vector V2. Concretely, as shown in FIG. 5, the parameter determining section 46 determines a shot angle (that is, an angle in the horizontal plane) based on a second operation vector angle $\theta_2$ being an angle formed by the second operation vector V2 to the −Y direction. Also, the parameter determining section 46 determines a vertical spin amount based on the size of a second operation vector of Y component VY2 being a component of the −Y direction in the second operation vector V2. At this time, the parameter determining section 46 calculates a difference value of the second operation vector of Y component VY2 to a preset vertical spin amount threshold, and sets this as a top spin or a back spin depending on the sign of the difference value, and further determines the size of the spin according to the size of the difference value (namely, rotating speed).

On the other hand, if a negative result is obtained in the step SP21, this means that the touch points T detected in a series of the touch operations are two or less, and operation points P at three positions cannot be specified. At this time, the operation input processing section 32 proceeds to the next step SP31.

Also, if a negative result is obtained in the step SP22, this means that the touch operation reaching the last touch point T(N) is the moving to the Y direction (downward direction), and the user did not perform appropriate touch operations. At this time, the operation input processing section 32 proceeds to the next step SP31.

Furthermore, if a negative result is obtained in the step SP27, this means that a second operation point P2 cannot be specified because neither the touch operation moving to the Y direction (downward direction) nor the touch operation not moving to the Y direction was performed in between the last touch point T(N) and the first touch point T(1). At this time, the operation input processing section 32 proceeds to the next step SP31.

In the step SP31, since operation points P at three positions (a first operation point P1, a second operation point P2 and a third operation point P3) cannot be specified from the detected number of touch points N of touch points T, the operation input processing section 32 urges the user to perform shot operations again by displaying a predetermined error message in the display section 15 or the like, and then proceeds to a step SP32.

In the step SP32, the operation input processing section 32 finishes the operation point specifying processing procedure RT3, and returns to the step SP4 of the previous shot operation processing procedure RT1 (FIG. 6).

Figure 15:
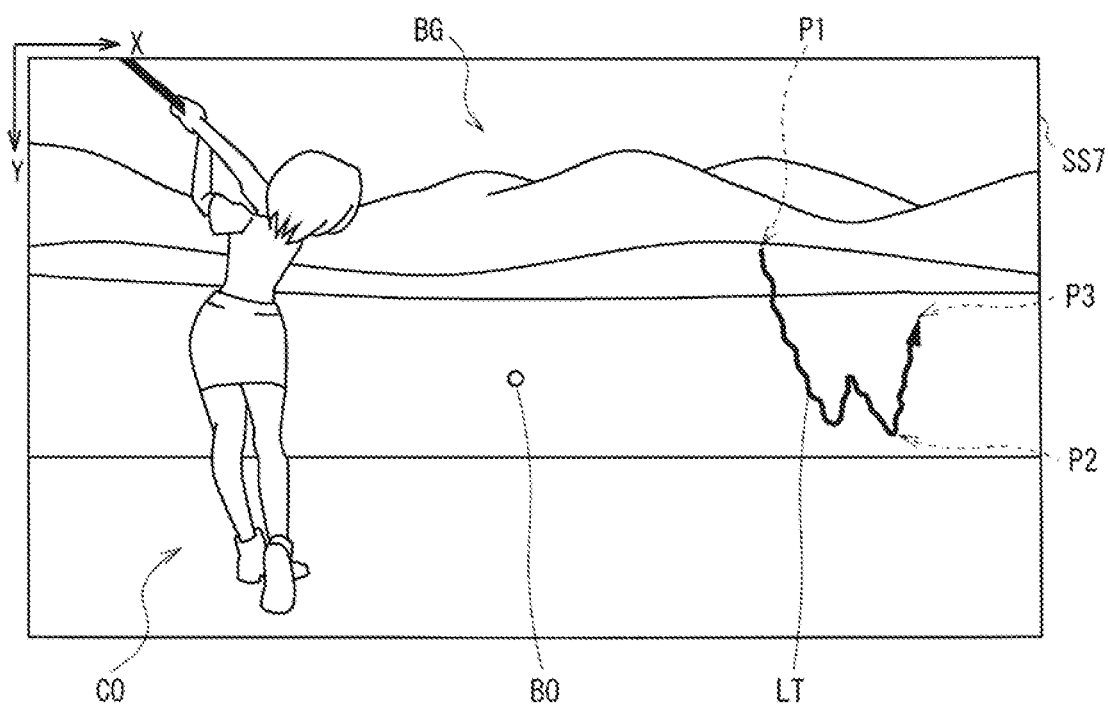
FIG. 15 is a schematic diagram showing the structure of a shot screen.

After this, the control section 11 goes on each processing in the shot operation processing procedure RT1, and if it proceeds to the step SP7, the control section 11 makes to display a shot screen SS7 shown in FIG. 15 in the display section 15 by the display processing section 34 (FIG. 3). In this shot screen SS7, the power gage PG and power line PL displayed in the shot screen SS6 (FIG. 13) have deleted, and the character object CO has changed to an attitude swinging the golf club. Also, in the shot screen SS7, the ball object BO is drawn as moving forward along the trajectory calculated in the trajectory calculation processing. In this connection, as to the character object CO and ball object BO, states that they are moving are displayed by animations respectively.

[1-7. Effects and the Like]

In the above configuration, in shot operations of a golf game, the control section 11 of the portable digital assistant 1 according to the first embodiment determines shot parameters necessary for the trajectory calculation of a golf ball, after detecting a plurality of touch points T based on user's touch operations and specifying operation points P at three positions from among the touch points T.

In the operation point specifying processing procedure RT3 (FIG. 14), the control section 11 specifies the first touch point T(1) as a first operation point P1, and specifies the last touch point T(N) as a third operation point P3, by the operation input processing section 32 (FIG. 3). Then, the operation input processing section 32 specifies the touch point T where the moving direction of the Y direction reversed or stopped as a second operation point P2, while tracing each touch point T in reverse order to the order detected from the last touch point T(N).

Thereby, the portable digital assistant 1 can recognize the position that the user last moved his/her finger or the like to the −Y direction (upward direction) in touch operations as that the user operated with a conscious of a move from the second operation point P2 to the third operation point P3, so that it is be able to perform a shot motion complying with user's wish.

By the way, in the portable digital assistant 1, it also can be considered to take another method different from these embodiments such that "the touch point T where the moving direction of the Y direction reversed is specified as a second operation point P2" based on user's touch operations. And in this method, it comes to that, among the touch points T shown in FIG. 4, the touch point T(b) where the moving direction of the Y direction first reversed is specified as a second operation point P2.

On the other hand, if observing each touch point T shown in FIG. 4, it is judged that, despite the user once started to a move his/her finger or the like to the −Y direction (upward direction) by considering that the size of the power value is sufficient at the touch point T(b), the user reconsidered at the touch point T(c), and moved the finger or the like to the Y direction (downward direction) again by considering that should make to further increase the size of the power value. However, in the case where the aforementioned other method is taken, in the portable digital assistant 1, since the touch point T(b) is specified as a second operation point P2 contrary to the user's wish, the trajectory of a golf ball is unfortunately calculated in the state where the power value is insufficient.

On the contrary to this, since the portable digital assistant 1 according to these embodiments trace each touch point T in the reverse order to the detected order from the last touch point T(N), even in the case where the user reconsidered in the middle, the touch point T where the direction of the move to the Y direction last reversed or stopped is regarded as a point having a high possibility that the user was conscious of it as a second operation point P2 at last, so that it is able to be appropriately specified as the second operation point P2.

Particularly in this golf game, the touch point T(1) where the user first touched the touch panel 3 in a shot operation is set as a first operation point P1. In the first operation vector V1 from this first operation point P1 to a second operation point P2 (FIG. 5), the size of the Y direction component represents the size of the power value. This power value is the value significantly affecting the carry of the golf ball.

Therefore, in touch operations, it is necessary that the user makes to specify his/her wishing touch point T as a second operation point P2, by moving his/her finger or the like toward the Y direction (downward direction), reversing its moving direction at a position corresponding to his/her wishing power value, and moving it to the −Y direction (upward direction). In actual touch operations, however, there is a possibility that the moving distance of user's finger or the like to the Y direction (downward direction) becomes too long or too short.

Since the portable digital assistant 1 according to these embodiments traces each touch point T in reverse order to the detected order from the last touch point T(N), it is able to ignore the positions where the moves of the Y direction reversed or stopped before the last touch point. In the portable digital assistant 1, it allows the user to make to move a touch point T to the Y direction or the −Y direction until determining the touch point T wishing as a second operation point P2 in one series of touch operations, that is, the adjustment of positions of the Y direction.

In other words, in the portable digital assistant 1 according to these embodiments, by taking into consideration the case where the user reconsidered in the middle of touch operations, and the case where the user could not operate successfully and the like, not tracing each touch point T in order from the first touch point T(1), each touch point T is traced in the reverse order to the detected order from the last touch point T(N). It enables to accept an operation input reflecting the user's final intention.

Furthermore, in the portable digital assistant 1, even in the case where the user performed a smooth touch operation that "moved the touch point T to the Y direction, and then moved to the −Y direction" without reconsideration and the adjustment of positions, the first operation point P1, second operation point P2 and third operation point P3 are able to be appropriately specified respectively. Operation inputs reflecting the user's intention are acceptable.

Consequently, the portable digital assistant 1 is able to accept input operations complying with user's wishes and perform shot motions, based on touch operations to the touch panel 3 by the user.

Furthermore, in the portable digital assistant 1, in the shot screen SS2 (FIG. 9) or the like, the power gage PG and power line PL are displayed respectively. Therefore, the portable digital assistant 1 is able to make the user reverse the moving direction of touch points in touch operations from the Y direction (downward direction) to the −Y direction (upward direction) at his/her wishing power values. It enables to make the user easily perform input operations complying with the user's wishes.

According to the above configuration, in the portable digital assistant 1 according to the first embodiment, in shot operations of a golf game, the first touch point T(1) and the last touch point T(N) are specified as a first operation point P1 and a third operation point P3 respectively. Furthermore, in the portable digital assistant 1, the touch point T where the moving direction of the Y direction reversed or stopped are specified as a second operation point P2, while tracing in the reverse order to the order that each touch point T was detected from the last touch point T(N). Thereby, in the portable digital assistant 1, the position where the user last reversed the moving direction of the Y direction of his/her finger or the like or stopped in touch operations is able to be recognized that was operated with a conscious of it as a second operation point P2. Consequently, it is able to perform shot operations complying with the user's wishes.

2. Second Embodiment

A portable digital assistant 201 according to a second embodiment (FIGS. 1 and 2) is different in a point having a control section 211 instead of the control section 11 as compared with the portable digital assistant 1 according to the first embodiment, but is similarly configured as to other points.

When in executing a golf game, the control section 211 (FIG. 3) is different in a point forming an operation input processing section 232 and a second operation point specifying section 244 instead of the operation input processing section 32 and the second operation point specifying section 44 as compared with the control section 11 according to the first embodiment, but is similarly configured as to other points.

The control section 211 sets an upper limit number of search M (for example a value "5") in advance. This upper limit number of search M is a number, in the operation point specifying processing (the step SP4 in FIG. 6), to be the upper limit at the time of searching the second operation point P2 while tracing each touch point T in the reverse order to the order of the detection from the third operation point P3 that was the last touch point T(N).

Figure 14:
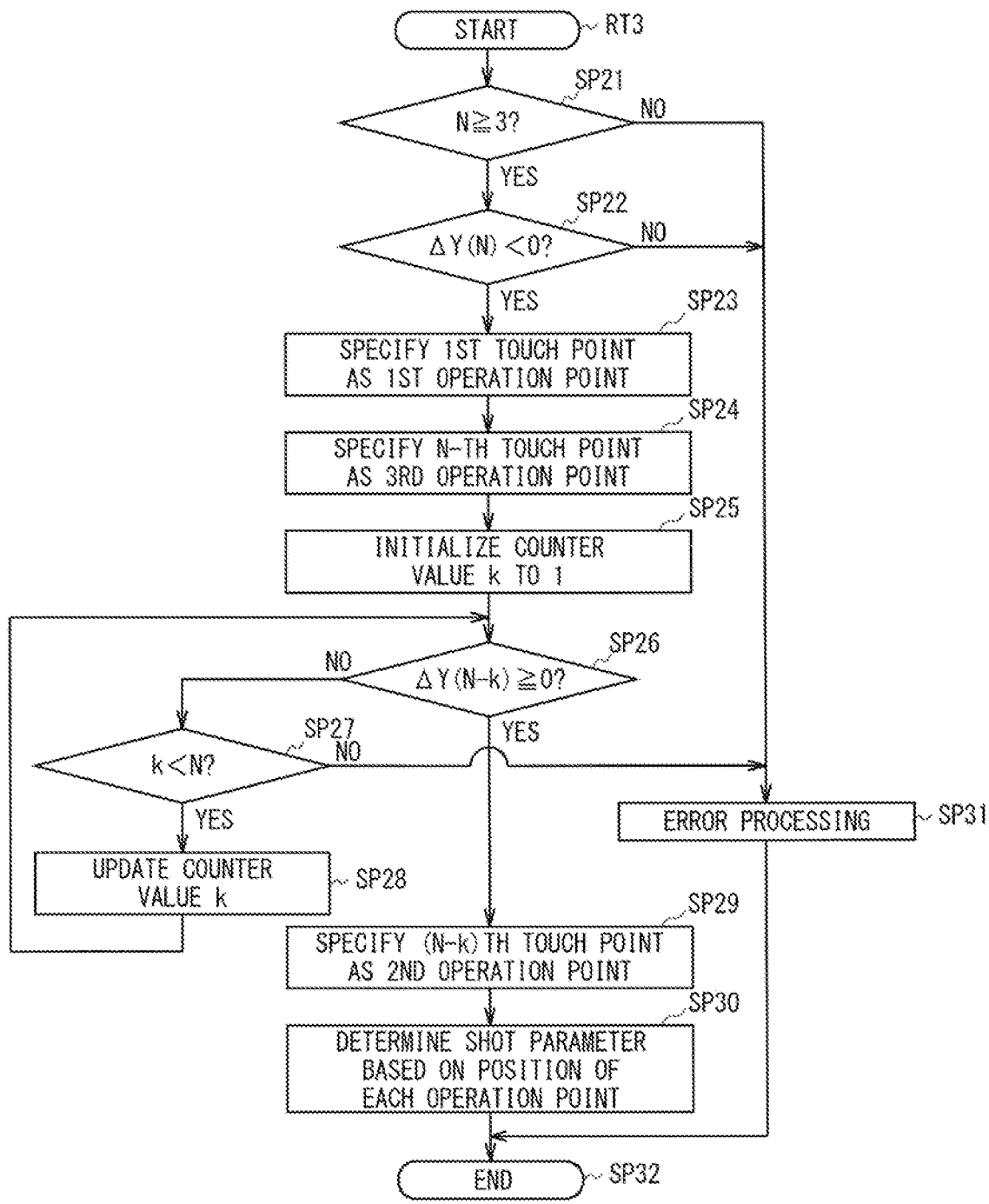
FIG. 14 is a flowchart showing an operation point specifying processing procedure according to the first embodiment.
Figure 16:
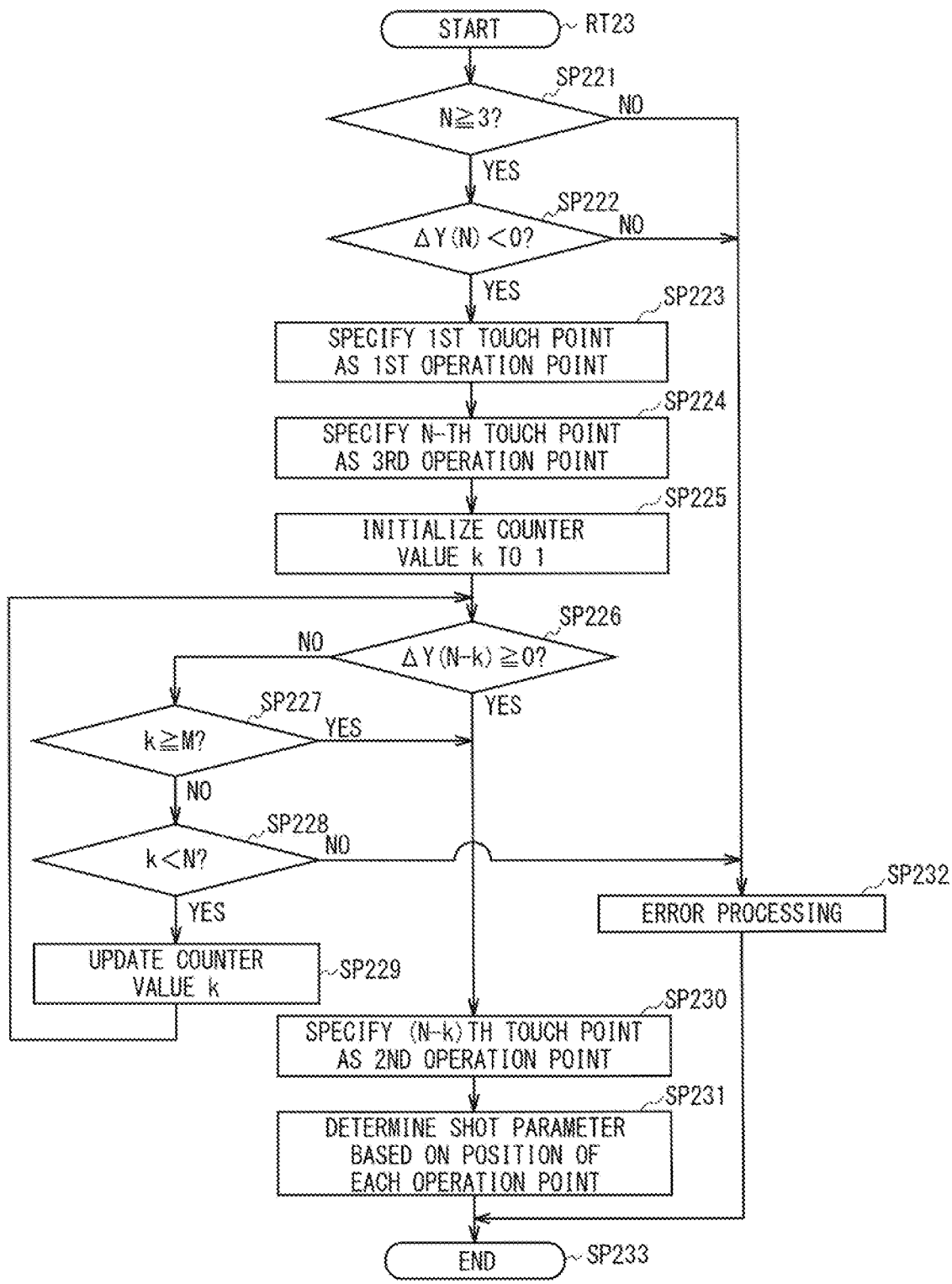
FIG. 16 is a flowchart showing an operation point specifying processing procedure according to a second embodiment.

Furthermore, the control section 211 executes the shot operation processing procedure RT1 (FIG. 6) in the execution of the golf game similarly to the first embodiment, but is designed to execute, in the step SP4, an operation point specifying processing procedure RT23 shown in FIG. 16 as a subroutine instead of the operation point specifying processing procedure RT3 (FIG. 14).

At this time, the control section 211 controls to start the operation point specifying processing procedure RT23 (FIG. 16) as a subroutine by the operation input processing section 232, and then proceeds to the first step SP221.

The operation input processing section 232 performs, in steps SP221 to SP226, the processing similar to the steps SP21 to SP26 of the operation point specifying processing procedure RT3 (FIG. 14) respectively. If a negative result is obtained in the step SP226, the operation input processing section 232 proceeds to the next step SP227.

The operation input processing section 232, in the step SP227, determines whether or not a counter value k is larger than the upper limit number of search M by the second operation point specifying section 244. If a negative result is obtained here, this means that since the number of touch points T searched to the present is smaller than the upper limit number of search M, a second operation point P2 should be continuously searched. At this time, the operation input processing section 232 proceeds to the next step SP228.

On the other hand, If an affirmative result is obtained in the step SP227, this means that since the searched number of touch points T to the present is larger than the upper limit number of search M, the search processing should be ended and the present touch point T(N−k) should be regarded as the second operation point P2. At this time, the operation input processing section 232 proceeds to the next step SP230.

Figure 17:
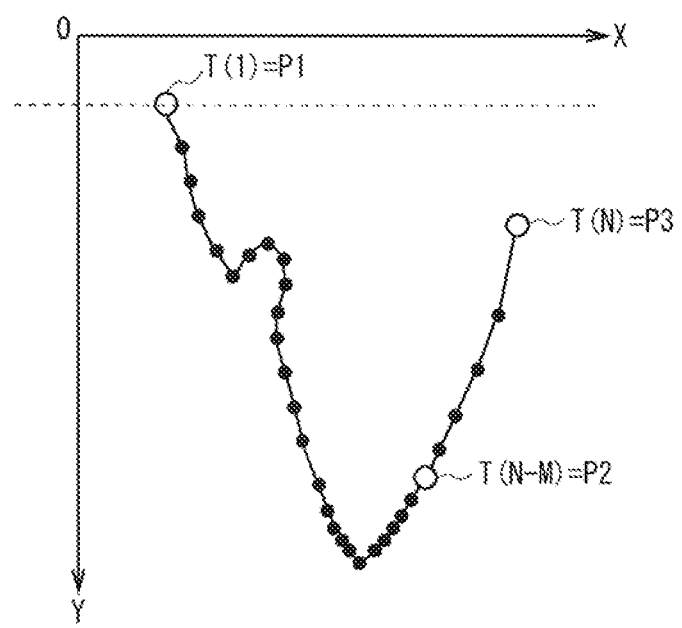
FIG. 17 is a schematic diagram showing the detection of touch points and the specifying of operation points according to the second embodiment.

In this case, the second operation point specifying section 244 of the operation input processing section 232 is able to specify a touch point T(N−M) where the moving direction of the Y direction was neither reversed nor stopped as the second operation point P2, as shown in FIG. 17 corresponding to FIG. 4.

And then, the operation input processing section 232, in the steps SP228 to SP232, performs the similar processing to the steps SP27 to SP31 of the operation point specifying processing procedure RT3 (FIG. 14) respectively, and then proceeds to the step SP233 to finish the operation point specifying processing procedure RT23, and returns to the step SP4 of the previous shot operation processing procedure RT1 (FIG. 6).

In the above configuration, in the shot operation of the golf game, the control section 211 of the portable digital assistant 201 according to the second embodiment, similarly to the first embodiment, determines shot parameters necessary for the trajectory calculation of a golf ball, after detecting a plurality of touch points T based on user's touch operations and specifying the operation points P at three positions from among the touch points T.

In the operation point specifying processing procedure RT23 (FIG. 16), the control section 211 specifies the first touch point T(1) as the first operation point P1 and the the last touch point T(N) as the third operation point P3, by the operation input processing section 232 (FIG. 3). After the processing, the operation input processing section 232 specifies the touch point T where the moving direction of the Y direction reversed or stopped as the second operation point P2, while tracing the touch points T in the reverse order to the order that detected each touch point T from the last touch point T(N).

Thereby, similarly to the first embodiment, the portable digital assistant 201 is able to recognize that the user performed the touch operations while being conscious of the position where the user moved his/her finger or the like last to the −Y direction (upward direction) in the touch operations as a move from the second operation point P2 to the third operation point P3. It enables to perform a shot operation complying with the user's wish.

By the way, in the touch operations, there is a case where the user performs such operation that moving slowly his/her finger or the like to the −Y direction (upward direction) and suddenly starting to accelerate at a position wanting to set as the second operation point P2 without reversing the moving direction of the Y direction or stopping, and then leaving his/her finger or the like from the touch panel 3. In this case, at the touch point T that the user wants to set there as the second operation point P2, the moving direction of the Y direction neither did not reverse nor stop. Therefore, in the operation point specifying processing procedure RT3 (FIG. 14) according to the first embodiment, it is difficult to specify such touch point T as the second operation point P2.

On the contrary to this, in the portable digital assistant 201 according to the second embodiment, it is designed to set the upper limit number of search M, and when the searched number from the last touch point T(N) became larger than the upper limit number of search M, the touch point T(N−M) will be specified as the second operation point P2 (FIGS. 16 and 17). Thereby, the portable digital assistant 201 is able to specify the touch point T that the user suddenly accelerated the move to the −Y direction or a touch point T neighboring there as the second operation point P2, only if appropriately setting the upper limit number of search M in advance.

Also as to the other points, the portable digital assistant 201 according to the second embodiment enables to provide the similar effects to the first embodiment.

According to the above configuration, in shot operations of a golf game, the portable digital assistant 201 according to the second embodiment specifies the first touch point T(1) and the last touch point T(N) as the first operation point P1 and the third operation point P3 respectively. The portable digital assistant 201 specifies the touch point T where the moving direction of the Y direction reversed or stopped as the second operation point P2, while tracing the touch points T in the reverse order to the order that detected each touch point T from the last touch point T(N). Furthermore, when the second operation point P2 could not be specified within the upper limit number of search M from the last touch point T(N), the portable digital assistant 201 specifies the touch point T(N-M) as the second operation point P2. Thereby, the portable digital assistant 201 is able to recognize that, in the touch operations, the user performed the touch operations while being conscious of the position that he/she last reversed the moving direction of the Y direction of the user's finger or the like or stopped, or the position that the he/she suddenly started to accelerate the finger or the like, as the second operation point P2. As the result, it enables to perform a shot operation complying with the user's wish.

3. Other Embodiments

Note that, in the above embodiments, it has dealt with the case where in the step SP26 of the operation point specifying processing procedure procedure RT3 (FIG. 14), the second operation point P2 is specified when ΔY(N−k) is larger than the value "0" and the moving direction of the Y direction reversed or stopped. However, the present invention is not only limited to this, but for instance, the second operation point P2 may be specified only when ΔY(N−k) is larger than the value "0" and the moving direction of the Y direction reversed. Or the second operation point P2 may be specified when ΔY(N−k) is larger than a predetermined threshold different from the value "0". These are the same also of the second embodiment.

In the aforementioned first embodiment, it has dealt with the case where, in the operation point specifying processing procedure RT3 (FIG. 14), the last touch point T(N) is set as the third operation point P3 when the user left his/her finger or the like from the touch panel 3 and completed the touch operations. However, the present invention is not only limited to this, but the processing may be proceeded to the step SP31 to perform error processing without specifying an operation point when the Y moving distance ΔY(N) toward the −Y direction (upward direction) in one frame was smaller than a predetermined threshold between touch points T mutually consecutive in order, that is, when the moving speed of the −Y direction was slower than a predetermined speed, for instance. It enables to make the user reperform touch operations when the user unfortunately left his/her finger or the like from the touch panel 3 by erroneous operation, on the half way of the moving while increasing the moving speed toward the −Y direction. This is the same also of the second embodiment.

Furthermore, in the aforementioned first embodiment, it has dealt with the case where, in the operation point specifying processing procedure RT3 (FIG. 14), the touch point T where the moving direction of the Y direction reversed or stopped is specified as the second operation point P2, while tracing each touch point T in the order reverse to their detection from the last touch point T(N). However, the present invention is not only limited to this, but the touch point T where the moving direction of the direction along a predetermined reference axis reversed or stopped may be specified as the second operation point P2, while tracing each touch point T in the order reverse to their detection from the last touch point T(N). In this case, as the reference axis, various directions such as the direction of gravity that was detected by the inclination sensor 17, for example, may be set. This is the same also of the second embodiment.

Furthermore, in the aforementioned first embodiment, it has dealt with the case where the touch points T are detected for every one frame in touch operations in the case where the frame rate in the display section 15 of the touch panel 3 is 30 frames per second. However, the present invention is not only limited to this, but touch points T may be detected for every various frame rates other than that or for every time period different from the frame rate of the display section 15. These are the same also of the second embodiment.

Furthermore, in the aforementioned first embodiment, it has dealt with the case where the power gage PG and power line PL are displayed in the shot screen SS2 (FIG. 9) or the like. However, the present invention is not only limited to this, but at least one of the power gage PG and power line PL for example, may be omitted. Furthermore, in the shot screen SS2 or the like, figures, symbols and the like which represent various information concerning touch operations, such as a figure and a symbol representing the first touch point T(1), and a figure and a symbol representing the touch locus line LT may be arbitrary displayed. These are the same also of the second embodiment.

Furthermore, in the aforementioned first embodiment, it has dealt with the case where, in the step SP30 of the operation point specifying processing procedure RT3 (FIG. 14), the power value is determined based on the size of the first operation vector of Y component VY1 and the horizontal spin amount is determined based on the size of the first operation vector of X component VX1 (FIG. 5). Also, in the first embodiment, it has dealt with the case where the shot angle is determined based on the second operation vector angle θ2 and the vertical spin amount is determined based on the size of the second operation vector of Y component VY2. However, the present invention is not only limited to this, but shot parameters such as power values may be determined, based on various values such as the Y direction component of the second operation vector V2, that will be obtained based on the relative positions of the first operation point P1, second operation point P2 and third operation point P3. Concretely, it is able to use such values as the following (A1) to (A17). These are the same also of the second embodiment.

(A1) Distance between first operation point P1 and second operation point P2
(A2) Number of touch points T or moving time between first operation point P1 and second operation point P2
(A3) Size of predetermined direction component of first operation vector V1
(A4) Angle to predetermined axis of first operation vector V1
(A5) Linearity of locus from first operation point P1 toward second operation point P2
(A6) Distance between second operation point P2 and third operation point P3
(A7) Number of touch points T or moving time between second operation point P2 and third operation point P3
(A8) Linearity of locus from second operation point P2 toward third operation point P3
(A9) Size of predetermined direction component of second operation vector V2
(A10) Angle to predetermined axis of second operation vector V2
(A11) Distance between first operation point P1 and third operation point P3

(A12) Total number of touch points T or moving time from first operation point P1 reaching third operation point P3
(A13) Size of predetermined direction component of vector from first operation point P1 toward third operation point P3
(A14) Angle to predetermined axis of vector from first operation point P1 toward third operation point P3
(A15) Length of locus from first operation point P1 through second operation point P2 and reaching third operation point P3
(A16) Area of triangle connecting first operation point P1, second operation point P2 and third operation point P3
(A17) Area of figure surrounded by locus from first operation point P1 through second operation point P2 and reaching third operation point P3

Furthermore, in the aforementioned first embodiment, it has dealt with the case where, in the step SP30 of the operation point specifying processing procedure RT3 (FIG. 14), the shot parameters such as the power value, horizontal spin amount, shot angle, and vertical spin amount are determined based on the positions of the operation points P at three positions. However, the present invention is not only limited to this, but other various shot parameters may be determined based on the positions of the operation points P at three positions. Concretely, it is able to use such shot parameters as the following (B1) to (B4). This is the same also of the second embodiment.

(B1) Elevation angle of golf ball (that is, angle to horizontal plane)
(B2) Initial velocity of golf ball
(B3) Flying distance
(B4) Rotating speed and rotational direction after landing Furthermore, in the aforementioned first embodiment, it has dealt with the case where the shot parameters in shot operations are determined by specifying the three operation points P based on user's touch operations in a golf game. However, the present invention is not only limited to this, but parameters in a putting operation for that a putter will be used on a putting green may be arbitrary determined based on the three operation points P, for instance. This is the same also of the second embodiment.

Furthermore, in the aforementioned first embodiment, it has dealt with the case where the operation input processing section 32 of the control section 11 or the like is formed as a functional block by a software. However, the present invention is not only limited to this, but at least a part of the operation input processing section 32 or the like may be constituted as a circuit by a hardware. This is the same also of the second embodiment.

Furthermore, in the aforementioned first embodiment, it has dealt with the case where the golf game is executed by previously storing the application program of the golf game in the storage section 12 (FIG. 2), and reading and executing the application program. However, the present invention is not only limited to this, but the application program of a golf game may be acquired and executed from an external server or the like (not shown in the drawings) via the communication section 13 for example. Or the application program of a golf game may be read and executed from a recording medium such as a detachable memory card. In short, a golf game may be executed by executing its application program acquired via various means. These are the same also of the second embodiment.

Furthermore, in the aforementioned first embodiment, it has dealt with the case where the present invention is applied to the portable digital assistant 1 being a smartphone. However, the present invention is not only limited to this, but the present invention may be applied to various information processing equipment providing a touch panel such as a tablet terminator, a notebook computer, a watch type terminal device also called a smart watch or the like, an operation panel provided on a dashboard in an automobile, the back of a sheet and the like. This is the same also of the second embodiment.

Furthermore, the present invention is not only limited to the aforementioned every embodiments and other embodiments. That is, the scope of the present invention extends to embodiments by that a part of or all of the aforementioned every embodiment and the aforementioned other embodiments are arbitrary combined, and embodiments by that a part of those is picked out.

INDUSTRIAL APPLICABILITY

The present invention is applicable to the case of executing golf games in portable digital assistants such as smartphones, for example.

EXPLANATION OF REFERENCE SYMBOLS 1, 201—portable digital assistant, 3—touch panel, 11, 211—control section, 12—storage section, 14—operation section, 15—display section, 32, 232—operation input processing section, 33—trajectory calculation processing section, 41—touch point detecting section, 42—touch point management section, 43—first operation point specifying section, 44, 244—second operation point specifying section, 45—third operation point specifying section, 46—parameter determining section, 51—touch point storage region, 52—operation point storage region, M—upper limit number of search, N—number of touch points, p—operation point, P1—first operation point, P2—second operation point, P3—third operation point, T—touch point, ΔY—moving distance in Y.

The invention claimed is:
1. A non-transitory computer readable medium having stored thereon an operation input program that when executed by an information processing device, causes the information processing device to perform an operation input method comprising:
  detecting, when successive touch operations to a touch panel were performed, touched positions as touch points for each prescribed period;
  sequentially recording data representing the touched positions and an order of the touch points;
  specifying a touch point firstly detected in the touch operations as a first operation point;
  specifying a touch point lastly detected in the touch operations as a third operation point;
  specifying, after the third operation point was specified, a touch point that a moving direction of a prescribed axis direction reversed or stopped as a second operation point, by tracing the touch points in a reverse order to an order that the touch points were detected in the detecting from the third operation point; and
  determining parameters to be used in an application based on positions of the first operation point, second operation point and third operation point.
2. The non-transitory computer readable medium according to claim 1, wherein the determining of the parameter includes determining a shot parameter to be used in a shot operation to a golf ball in a golf game, based on relative positions of the first operation point, second operation point and third operation point.

3. The non-transitory computer readable medium according to claim 1, wherein the specifying of the second operation point, when in tracing the touch points in a reverse order to an order in the touch operations from the third operation point, if the touch point that the moving direction of the prescribed axis direction reversed or stopped does not exist within a range that followed the touch points up to a predetermined upper limit number, includes specifying the touch point followed by the upper limit number in the reverse order to the order in the touch operations from the third operation point as the second operation point.

4. The non-transitory computer readable medium according to claim 1, wherein the specifying of the third operation point, if a moving speed from a touch point detected immediately before to a touch point lastly detected in the touch operations is less than a predetermined threshold, includes omitting to specify the third operation point and omitting to determine a parameter in the determining.

5. The non-transitory computer readable medium according to claim 1, wherein the operation input method further includes updating, after the first operation point was specified by the specifying of the first operation point, contents of display to be displayed in a touch panel according to the moving direction of the touch point, while keeping detection of the touch points by the detecting.

6. An operation input method, comprising:
  detecting, when successive touch operations to a touch panel were performed, touched positions as touch points for each prescribed period, by a detecting section;
  sequentially recording data representing the touch positions and an order of the touch points, by a storage section;
  specifying a touch point firstly detected in the touch operations as a first operation point, by a first operation point specifying section;
  specifying a touch point lastly detected in the touch operations as a third operation point, by a third operation point specifying section;
  specifying, after the third operation point was specified, a touch point that a moving direction of a prescribed axis direction reversed or stopped as a second operation point, by tracing the touch points in a reverse order to an order that the touch points were detected in the detecting from the third operation point, by a second operation point specifying section; and
  determining parameters to be used in an application based on positions of the first operation point, second operation point and third operation point, by an operation section.

7. The operation input method according to claim 6, wherein the determining of the parameter includes determining a shot parameter to be used in a shot operation to a golf ball in a golf game, based on relative positions of the first operation point, second operation point and third operation point.

8. The operation input method according to claim 6, wherein the specifying of the second operation point, when in tracing the touch points in a reverse order to an order in the touch operations from the third operation point, if the touch point that the moving direction of the prescribed axis direction reversed or stopped does not exist within a range that followed the touch points up to a predetermined upper limit number, includes specifying the touch point followed by the upper limit number in the reverse order to the order in the touch operations from the third operation point as the second operation point.

9. The operation input method according to claim 6, wherein the specifying of the third operation point, if a moving speed from a touch point detected immediately before to a touch point lastly detected in the touch operations is less than a predetermined threshold, includes omitting to specify the third operation point and omitting to determine a parameter in the determining.

10. The operation input method according to claim 6, further comprising:
  updating, after the first operation point was specified by the specifying of the first operation point, contents of display to be displayed in a touch panel according to the moving direction of the touch point, while keeping detection of the touch points by the detecting.

* * * * *